April 4, 1950     A. ARNULF     2,502,913

REFRACTOMETER

Filed Nov. 20, 1945     2 Sheets-Sheet 1

INVENTOR
ALBERT ARNULF
BY
Roberts B. Larson
ATTORNEY

April 4, 1950     A. ARNULF     2,502,913
REFRACTOMETER
Filed Nov. 20, 1945     2 Sheets-Sheet 2
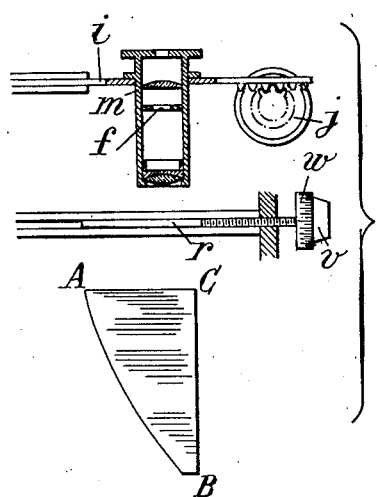
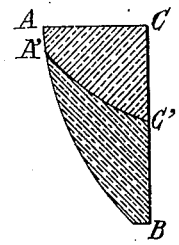
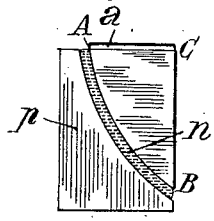
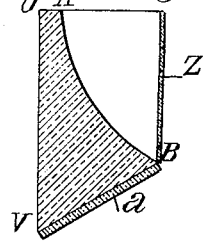
INVENTOR
ALBERT ARNULF
BY
Roberts B Larson ATTORNEY Patented Apr. 4, 1950

2,502,913

UNITED STATES PATENT OFFICE 2,502,913

REFRACTOMETER

Albert Arnulf, Paris, France, assignor to Institut D'Optique Theorique et Appliquee, Paris, France, a society of France Application November 20, 1945, Serial No. 629,833
In France May 26, 1944

Section 1, Public Law 690, August 8, 1946
Patent expires May 26, 1964

12 Claims. (Cl. 88—14)

The present invention relates to refractometers and one of its principal objects is to provide an apparatus of this kind which is better adapted to meet the requirements of practice than those used up to the present time.

Most of the existing refractometers include a prism one of the faces of which is in contact with the substance the refractive index of which is to be measured, and means for measuring the direction of the emergent light beam produced by the tangentially incident rays, or the rays of an incidence corresponding to the limit of total reflection, that strike this face. Such types of apparatus are, as a rule, complicated, delicate, and therefore expensive.

According to a feature of the present invention, instead of making use of such a prism, I utilize a mass of a transparent material of a shape such that the surface thereof that is struck by light rays as above mentioned is curved and adapted to give a caustic at finite distance for the emergent rays corresponding to these incident rays. With such an arrangement, it suffices to determine the position of at least one point of said caustic in space for obtaining the value of the refractive index of the substance that is in contact with the surface in question of said mass.

Other objects and features of the present invention will result from the following description of some specific embodiments thereof with reference to the accompanying drawings, given merely by way of example, and in which:

Figs. 3, 4 and 5 are diagrammatical views showing three different embodiments of refractometers according to my invention;

Fig. 6 is a diagrammatic view of an arrangement for obtaining achromatism;

Fig. 7 shows an arrangement including two transparent pieces between which is interposed a thin layer of the liquid the refractive index of which is to be measured; and Fig. 8 is a diagrammatical view of a modification.

Figure 1:
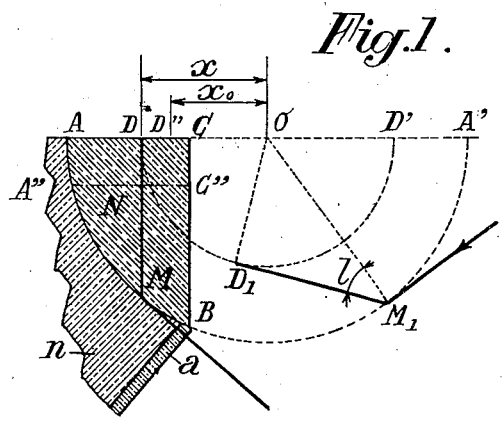
Fig. 1 is a diagrammatic sectional view of a block of transparent material for use in a refractometer according to the present invention.

In the following description, it will be assumed that the masses of transparent material above referred to are in the form either of prisms (having their edges at right angles to the plane of the drawing) or of bodies of revolution (having their axes in the plane of the drawing).

The drawings can be considered as showing either of these forms.

As shown by Fig. 1, the meridian section AB of the curved face of the block (which, as above stated, is to be struck by the tangentially incident rays or the rays of an incidence corresponding to the limit of total reflection) is constituted by a circle.

Figure 2:
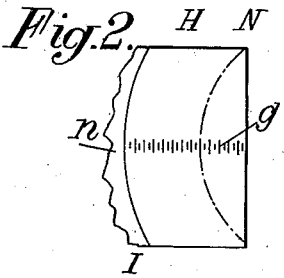
Fig. 2 is a plan view corresponding to Fig. 1.

In other words, the glass block is supposed to be an element of a sphere of center O (as above stated, it might be a portion of a cylinder of circular cross section having its axis perpendicular to the plane of Fig. 1 and passing through O) limited, in vertical section, by two plane surfaces AC and BC (AC being a diametral plane) and, in a direction at right angles, by two plane surfaces H and I (Fig. 2).

The refractive index of the material of which the block is made is N and that of the medium in contact with curved face AB is $n$.

All the tangentially incident rays that strike surface AB are, after refraction, tangent to a sphere of radius $OD = x$, for the following reason:

Taking a ray tangentially incident at $M_1$ to the semi-spherical surface out of which the block ABC has been taken, and supposing that this semi-spherical surface limits a block of refracting material of index N, the angle $l$ of the refracted ray $M_1D_1$ with the normal $OM_1$ to said surface at $M_1$ is defined by the following equation:

$$n = N \sin l$$

If $OD_1$ is a perpendicular to the refracted ray $M_1D_1$ passing through O, the rectangular triangle $OD_1M_1$ gives:

$$\sin l = \frac{OD_1}{OM_1} = \frac{x}{R}$$

R being the radius of the spherical surface.
Therefore:

$$n = N\frac{x}{R}$$

For a given medium in contact with face AB, $n$, N and R are constant. Consequently $x$ is a constant. This means that the caustic of the refracted rays is a sphere of center O and radius $x$.

Considering the point M of surface AB which is such that the refracted ray MD is normal to surface AC, that is to say vertical in the example shown, distance OD is equal to $x$. Therefore, there will exist on face AC a limit separating a bright zone and a dark zone, which limit will be seen with the maximum of sharpness if it is observed through means eliminating the rays that are not substantially normal to surface AC. Such means are for instance constituted by a microscope or a lens diaphragmed in its image focal plane and having its optical axis perpendicular to face AC.

The value of $n$ will be given by the above relation:

$$n = \frac{N}{R} x$$

This relation is particularly simple since $n$ is proportional to $x$.

If the semi-sphere were complete, it would be possible to measure the diameter $DD' = 2x$ of the limit circle. For practical purposes, the position of point D will be measured with reference to a point D'' corresponding to a known value $n_0$ of the refractive index of the medium in contact with surface AB and for which the radius of the limit circle is $x_0$. It will be found that:

$$n - n_0 = (x - x_0)\frac{N}{R} = (x - x_0)$$

multipled by a constant.

The distance $x - x_0$ between the limits of the bright and dark zones is still proportional to the difference $n - n_0$ between the refractive index to be determined and the known index taken as reference.

The caustic has a sharp edge which permits accurate readings. The sharp limit is localized at the point where the mean ray of the light beam that is used is tangent to the caustic. This point will be located in diametral plane AA' if the mean ray in question is normal to face AA', whatever be the value of the index $n$ to be measured.

If, as supposed on the drawing, the transparent block is a spherical block, the limit line in plane AOA' is a circumference of center O. If the block were of prismatic shape (with a cylindrical face AB) having its edges perpendicular to the plane of the drawing, the limit line would be a straight line passing through point D and at right angles to the plane of the drawing.

In order to obtain a device of smaller size, it may be advantageous to limit the transparent block by a plane face A''C'' parallel to AC and located below the horizontal diametral plane passing through C. In this case, the limit curve is formed in air instead of being formed in the plane face of the block. The properties and formulas above set forth remain unchanged with this arrangement.

In the preceding explanations, I have considered only the case of incident rays tangential to face AB. There is no modification if I make use of total reflection rays instead of refracted rays. The incident rays that are utilized then strike first face BC and those that strike curved face AB with the limit angle of total reflection form the limit line passing through D as above set forth, but the caustic is just the same.

The substance the refractive index of which is to be measured (and which is designated on the drawings by reference character $n$) is to be in direct contact with the matter of refractive index N which forms block ABC along face AB. For this purpose, if said substance $n$ is a solid, it must be cut to have a concave surface fitting exactly on face AB of the block (which involves no particular difficulty if line AB is a circular arc). If, on the other hand, substance $n$ is a liquid, it is interposed, in the form of a thin sheet between the face AB of a block ABC such as above described and a face of corresponding shape of a transparent block $p$ (if total reflection rays are employed, block $p$ need not be transparent). Such an arrangement is diagrammatically illustrated by Fig. 7.

It should be well understood that these indications are given merely by way of example and do not exclude other possible arrangements. For instance, in the modification illustrated by Fig. 8, which relates to the measurement of the refractive index of a liquid, the curved surface AB constitutes a concave face of a block ABVU made of a material the refractive index of which is smaller than that of said liquid. The liquid in question is then poured in a vessel formed between face AB and a wall Z. The indications and formulas above set forth remain applicable if N is taken to designate the refractive index of the liquid and $n$ that of the matter of which block ABVU is made.

The drawings do not show any particular source of light for incident rays since solar light or any diffuse light, for instance from a window, gives a sufficient amount of tangential rays or rays striking the curved face at the limit angle of total reflection.

Measurement of the relative position of the limit between the bright zone and the dark zone can be carried out in any suitable manner, for instance by employing any known mechanical or optical means. When the face AC of the block coincides with the diametral plane of sphere ABA' (Figs. 1 and 2) a graduated scale may be provided directly on this face, as shown at $g$ on Fig. 2.

It is advantageous to devise the apparatus in such manner as to obtain direct readings, which is made particularly simple by the fact that the displacement of the limit between bright zone and dark zone is proportional to the value of the index. If it is desired to have the smallest measurable variation of index to correspond to a displacement $dx$ of the limit in question, then:

$$dn = \frac{N}{R} dx \text{ i. e. } R = N \frac{dx}{dn}$$

According to a non-limitative example, if $dn = 10^{-4}$ and $dx = 0.01$ mm., then $$R = 100 \quad N = 100(n - n_0)$$

that is to say $N = 10$ mm. for $n - n_0 = 0.1$.

In order to increase the precision of the readings, it is advisable to make use of optical magnifying means. Said means must be further adapted to eliminate the light rays that are not substantially normal to the exit face AC of said block, owing, for instance, to the provision of a suitable diaphragm in the focal plane.

Figure 3:
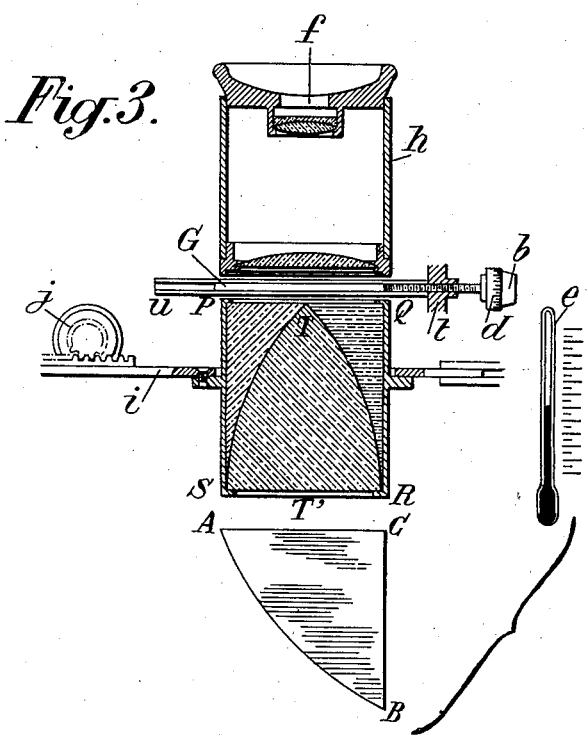

According to the embodiment of Fig. 3, a graduated scale G, disposed at a distance above face AC, is observed through an eyepiece $h$ provided with an eyehole $f$. In this embodiment, the eyepiece is made of sufficient field to permit of observing therethrough the whole of scale G.

Figure 4:
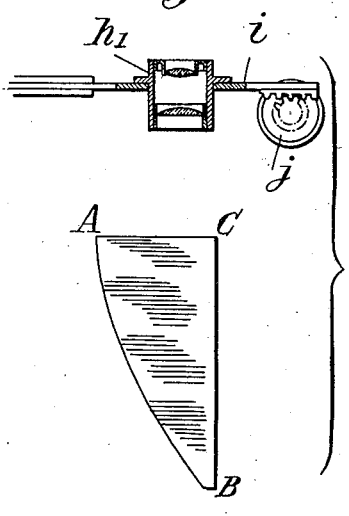

In the embodiment of Fig. 4, an eyepiece $h_1$ is also provided. But, as it is more powerful, its field cannot be sufficient for observing therethrough the whole of the graduated scale (which in this case is supposed to be formed on the upper face AC of block ABC). Consequently, eyepiece $h_1$ is mounted on a sliding support $i$ adapted to be displaced, for instance by means of a screw $j$, so as to have the limit line to be observed inside the field of said eyepiece.

In the embodiment of Fig. 5, I make use of a microscope $m$ instead of the eyepieces above mentioned. For the same reasons as above stated, this microscope is displaceable through means $i$, $j$. In this case, instead of observing a graduated scale, I observe a wire $r$ in coincidence with the limit line formed by the light rays on face AC. The adjustment of wire $r$ is effected through means $v$, $u$, $t$, and the value of the relative displacement corresponding to this adjustment is indicated by a graduated drum $w$.

When the substance the refractive index of which is to be measured is sensitive to variations of temperature, which, in particular, is the case of liquids, it is necessary to make allowance for such variations.

When the liquids that are to be studied have coefficients of temperature not very different from one another, it is of advantage to proceed as follows:

It will be supposed that the position of the limit line to be observed is determined by reading on a graduated scale G, as shown in Fig. 3.

Now, in order to permit of effecting the necessary corrections corresponding to variations of temperature, this graduated scale G is made movable through precision driving means, for instance a screw $b$. The temperature is given by a thermometer $e$. The graduations of this thermometer are made to correspond with those of means associated with the scale displacing mechanism for marking the displacements thereof. For instance, as shown by Fig. 3, screw $b$ is coupled with a graduated drum $d$ movable with respect to a fixed mark and the graduations of which correspond with those of the thermometer. It suffices to bring opposite this mark the graduation of said drum that bears the same number as marked by the thermometer for automatically ensuring the desired displacement of scale G in order to compensate for the effects of temperature variations.

The preceding explanations relate to the case of a monochromatic light.

If the incident light is changed, while remaining a monochromatic light, the proportionality between the indices to be measured and the distances above mentioned is maintained, but the coefficient of proportionality varies with the wavelength of this incident light. It suffices, in this case, knowing the law of dispersion of the transparent block, that is to say the values of index N for the various radiations, to establish a table of corrections, or to multiply the values read on the scales by a constant factor.

If the light that is used is a complex light, for instance white light, the limit between bright and dark zones will show chromatism, because there is a distinct limit for each of the incident radiations. In this case it is necessary to avoid this chromatic dispersion of the limits, that is to say to obtain achromatism.

Fig. 6 shows an arrangement for obtaining this result which is particularly applicable to the case of a refractometer intended for the measurement of the refractive indices of the liquids of a given category, for which it can be admitted that the difference between the indices corresponding to two different radiations is proportional to the mean value of these indices.

In this case, the block is made of two portions, respectively AA'C'C and A'BC'. These two portions are made of transparent materials, for instance glasses, of different dispersions and the refractive indices of which may be either different or equal for one given radiation. Through a suitable choice of the shape of surface A'C' it will be possible to obtain the desired correction.

If the mean dispersion of the substances that are studied varies within wide limits, the device of Fig. 6 is insufficient. In this case, I may for instance have recourse to a device of the kind illustrated by Fig. 3.

With this arrangement, the top part of the prism is replaced by a block of glass made of three portions, to wit PST, STR and QTR. In order to simplify the construction, faces PT and TQ may be constituted by a common surface, which is, for instance, parallel to face SR. These three portions will be made of glasses of different dispersions. They may have the same refractive index for a given radiation. Surfaces ST and TR will be made of the shape that is best suited to the variation of achromatism to be obtained.

A lateral displacement of the block in the plane of the drawing, obtained for instance by means of a pinion $j$ cooperating with a sliding support $i$ will result in bringing into action different parts of curved surfaces ST or TR and therefore obtaining different effects with a view to obtaining the desired achromatism. By shifting from portion PT to portion TQ, the direction of the correction will be changed, which will permit compensation when the body to be studied is more dispersive, or less dispersive, than the glass of which is made block ABC.

If the dispersion of the bodies to be studied is to be always either greater or smaller than that of the glass of block ABC, only one half (PST'T or TQRT') of the compensation block will be utilized.

In some cases, it may be advantageous to combine the arrangements of Figs. 6 and 3.

In order to improve the transparency of the apparatus and to reduce the parasitic light, the various optical surfaces will be treated according to known methods for reducing their reflection factor.

When the incident light is not monochromatic, in order to avoid the necessity of providing devices or arrangements such as above described for ensuring achromatism, a suitable filter will be interposed across the path of the light rays, as shown at $a$ in Figs. 1, 7 and 8.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A refractometer constituted by a transparent block having a curved transparent face to be immersed in the substance the refractory index of which is to be measured and to be illuminated by means of diffuse light coming from one side of said face, said curved face being in the form of a portion of a surface all the sections of which at right angles to a given direction are portions of circles having their respective centers on a straight line parallel to said direction, said block having a transparent exit face for the light rays travelling through said block from said curved face which exit face is located in a plane parallel to said direction, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance.

2. A refractometer constituted by a transparent block having a curved transparent face to be immersed in the substance the refractory index of which is to be measured and to be illuminated by means of diffuse light coming from one side of said curved face, said curved face being in the form of a portion of a cylinder of circular cross section, said block having a transparent exit face for the light rays travelling through said block from said curved face which exit face is located in a plane parallel to the axis of said cylinder, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance.

3. A refractometer constituted by a transparent block having a curved transparent face to be immersed in the substance the refractory index of which is to be measured and to be illuminated by means of diffuse light coming from one side of said face, said curved face being in the form of a portion of a sphere, said block having a plane transparent exit face for the light rays travelling through said block from said curved plane, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance.

4. In combination, a refractometer proper constituted by a transparent block having a curved transparent face to be immersed in the substance the refractory index of which is to be measured and to be illuminated by means of diffuse light coming from one side of said face, said curved face being in the form of a portion of a surface all the sections of which at right angles to a given direction are portions of circles having their respective centers on a straight line parallel to said direction, said block having a transparent exit face for the light rays travelling through said block from said curved face which exit face is located in a plane parallel to said direction, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance, and viewing means located opposite said exit face for examining it from a direction at right angles thereto.

5. In combination, a refractometer proper constituted by a transparent block having a curved transparent face to be immersed in the substance the refractory index of which is to be measured and to be illuminated by means of diffuse light coming from one side of said face, said curved face being in the form of a portion of a cylinder of circular cross section, said block having a transparent exit face for the light rays travelling through said block from said curved face which exit face is located in a plane parallel to the axis of said cylinder, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance, and viewing means located opposite said exit face for examining it from a direction at right angles thereto.

6. In combination, a refractometer proper constituted by a transparent block having a curved transparent face to be immersed in the substance the refractory index of which is to be measured and to be illuminated by means of diffuse light coming from one side of said face, said curved face being in the form of a portion of a sphere, said block having a plane transparent exit face for the light rays travelling through said block from said curved plane, said exit face being positioned with regard to said curved face so that light rays striking said exit face perpendicularly thereto, after travelling through said block from said curved face in a direction making with the normal to said curved face an angle equal to the maximum angle of refraction from said substance into said block, form the limit of a zone of illumination viewable in said exit face and the position of which, in said exit face, is an indication of the index of refraction of said substance, and viewing means located opposite said exit face for examining it from a direction at right angles thereto.

7. A refractometer according to claim 1 in which said exit face is the top face of said block and is located below said straight line.

8. A refractometer according to claim 1 in which said exit face is the top face of said block and is located below said straight line, said block further having a third transparent face located in a plane transverse to said exit plane and located on the same side as said curved face of a vertical plane passing through said straight line.

9. A refractometer constituted by a transparent block having a curved transparent face to be immersed in the substance the index of refraction of which is to be measured and to be illuminated by means of diffuse light coming from one side of said face, said curved face being in the form of a portion of a surface all the sections of which perpendicular to a given plane are portions of circles having their respective centers located in said plane, said block having a transparent exit face for the light rays travelling through said block from said curved face, which exit face is located in a plane parallel to said first mentioned plane, said exit face being positioned with respect to said curved face so that light rays striking said exit face perpendicularly thereto, after travelling through said block from said curved face in a direction making with the normal to said curved face an angle equal to the maximum of refraction from said substance into said block, form the limit of a zone of illumination viewable in said face and the position of which, in said exit face, is an indication of the index of refraction of said substance.

10. A refractometer constituted by a transparent block having a curved transparent face to be immersed in the substance the index of refraction of which is to be measured and to be illuminated by means of diffuse light coming from one side of said face, said curved face being in the form of a portion of a surface all the sections of which perpendicular to a given plane are portions of circles having their respective centers located in said plane, said block having a transparent exit face for the light rays travelling through said block from said curved face, which exit face is located in a plane parallel to said first mentioned plane, said exit face being positioned with respect to said curved face so that light rays striking said exit face perpendicularly thereto, after travelling through said block from said curved face in a direction making with the normal to said curved face an angle equal to the maximum of refraction from said substance into said block, form the limit of a zone of illumination viewable in said face and the position of which, in said exit face, is an indication of the index of refraction of said substance, and viewing means located opposite said exit face for examining it from a direction at right angles thereto.

11. A refractometer according to claim 9, in which said exit face is the top face of said block and is located below said first mentioned plane.

12. A refractometer according to claim 10, in which said exit face is the top face of said block and is located below said first mentioned plane.

ALBERT ARNULF.

REFERENCES CITED

The following references are of record in the file of this patent:

UNITED STATES PATENTS

| Number | Name | Date |
| --- | --- | --- |
| 1,968,202 | Hansen | July 31, 1934 |

FOREIGN PATENTS

| Number | Country | Date |
| --- | --- | --- |
| 440,898 | Germany | Feb. 18, 1927 |

OTHER REFERENCES

Journal of Optical Society of America, vol. 1, 1917, abstract on page 46; relative to refractometer. Published by American Institute of Physics, 57 East 55th St., New York, N. Y.

Hardy and Perrin; Text the Principles of Optics, page 360, McGraw-Hill Book Co. Inc., New York, 1932.

Descriptive booklet for Hard Optical Disc No. 8525, published by Central Scientific Company, Chicago, Illinois, page 6.